United States Patent
Miyata et al.

(10) Patent No.: US 11,890,918 B2
(45) Date of Patent: Feb. 6, 2024

(54) GLASS RUN FOR AUTOMOTIVE DOOR

(71) Applicant: Nishikawa Rubber Co., Ltd., Hiroshima (JP)

(72) Inventors: Tomonori Miyata, Hiroshima (JP); Shinji Nishikawa, Hiroshima (JP)

(73) Assignee: Nishikawa Rubber Co., Ltd., Hiroshima (JP)

( * ) Notice: Subject to any disclaimer, the term of this patent is extended or adjusted under 35 U.S.C. 154(b) by 619 days.

(21) Appl. No.: 17/117,241

(22) Filed: Dec. 10, 2020

(65) Prior Publication Data
US 2021/0229540 A1 Jul. 29, 2021

(30) Foreign Application Priority Data
Jan. 28, 2020 (JP) .................. 2020-011903

(51) Int. Cl.
*B60J 10/265* (2016.01)
*B60J 10/15* (2016.01)
*B60J 10/76* (2016.01)

(52) U.S. Cl.
CPC ............ *B60J 10/265* (2016.02); *B60J 10/15* (2016.02); *B60J 10/76* (2016.02)

(58) Field of Classification Search
CPC .......... B60J 10/265; B60J 10/15; B60J 10/76
USPC .................................................. 296/146.15
See application file for complete search history.

(56) References Cited

U.S. PATENT DOCUMENTS

| | | | | |
|---|---|---|---|---|
| 2017/0361693 A1* | 12/2017 | Miyata | .............. | B60J 10/88 |
| 2019/0176602 A1* | 6/2019 | Takeda | .............. | B60J 10/88 |
| 2019/0193541 A1* | 6/2019 | Takeda | .............. | B60J 10/16 |
| 2022/0227212 A1* | 7/2022 | Haruta | .............. | B60J 10/15 |

FOREIGN PATENT DOCUMENTS

| | | | | |
|---|---|---|---|---|
| DE | 102020111741 A1 | * | 11/2020 | ....... B29C 45/14434 |
| EP | 1382474 A1 | * | 1/2004 | .............. B60J 10/16 |
| JP | 2014-196051 A | | 10/2014 | |
| KR | 20140043618 A | * | 4/2014 | |

OTHER PUBLICATIONS https://www.matweb.com/search/DataSheet.aspx?MatGUID=c57f14a5ee484ada9618ef8cceaa9086 MATWEB Material Property Data for V.Low Hardness EPDM, 2023 (Year: 2023).*
https://www.matweb.com/search/DataSheet.aspx?MatGUID=6f8208c036144527bfa1313b7a158e0c MATLAB Material Property Data for Low Hardness EPDM, 2023 (Year: 2023).*

(Continued)

*Primary Examiner* — Hilary L Gutman
(74) *Attorney, Agent, or Firm* — Renner, Otto, Boisselle & Sklar, LLP

(57) ABSTRACT

A decorative member is attached to a side of a glass run outside a passenger compartment without degrading the workability in the attaching the glass run to a window frame, while reducing possible dents. The glass run includes a core, a base member located on the exterior wall of a trim outside the passenger compartment and made from a material with a high flexural modulus, and a decorative member fixed to a side of the base member outside the passenger compartment.

6 Claims, 3 Drawing Sheets

OUTSIDE PASSENGER COMPARTMENT ← → INSIDE PASSENGER COMPARTMENT

(56) References Cited

OTHER PUBLICATIONS https://www.matweb.com/search/DataSheet.aspx?MatGUID=8657cb29341140d299073edd1142d163 MATLAB Material Property Data for High Hardness EPDM, 2023 (Year: 2023).*
https://www.matweb.com/search/datasheet.aspx?matguid=0e8290919aea4c4b9961ccf2f60226e0 MATLAB Material Property Data for V.V High Hardness EPDM, 2023 (Year: 2023).*
Machine Translation of KR 20140043618 (A), Shown as KR 101926870 (B1), where KR 618 was published Apr. 10, 2014 With KR 870 published Dec. 7, 2018 (Year: 2014).*

* cited by examiner

OUTSIDE PASSENGER COMPARTMENT ←

→ INSIDE PASSENGER COMPARTMENT

GLASS RUN FOR AUTOMOTIVE DOOR

CROSS-REFERENCE TO RELATED APPLICATION

This application claims priority to Japanese Patent Application No. 2020-011903 filed on Jan. 28, 2020, the entire disclosure of which is incorporated by reference herein.

BACKGROUND

The present disclosure relates to a glass run, for an automotive door, attached to a door provided for a motor vehicle.

There are, as doors on both sides of motor vehicles, doors with a window frame holding the peripheral edge of a window glass. A door having such a window frame is provided with a glass run for sealing a gap between the window frame and the window glass.

Japanese Unexamined Patent Publication No. 2014-196051 discloses, in FIG. 3, a glass run to be assembled to a window frame from the outside of the passenger compartment. A glass run attached to a window frame from the outside of a passenger compartment as in Japanese Unexamined Patent Publication No. 2014-196051 may be employed under design requirements of the vehicle, for example.

The glass run according to Japanese Unexamined Patent Publication No. 2014-196051 includes a trim made from a hard resin. This trim has a bottom wall, a side wall closer to the glass run, and a side wall closer to the body. The bottom wall is located outside the passenger compartment and extends vertically. The side wall closer to the glass run extends from the lower end of the bottom wall toward the inside of the passenger compartment. The side wall closer to the body extends from the upper end of the bottom wall toward the inside of the passenger compartment. The bottom wall includes, on its surface outside the passenger compartment, a longitudinally long, band-like decorative member attached thereto. The decorative member may be a synthetic resin laminated film, a thin stainless steel film, or a film with a decorative pattern on its surface.

SUMMARY

The trim as disclosed in Japanese Unexamined Patent Publication No. 2014-196051 is generally formed by extrusion. A linear member obtained by the extrusion is cut into desired lengths and used as parts of the glass run. On the other hand, the window frame is generally curved along the shape of the roof of the vehicle body. There is thus a need to attach the linear trim to the window frame, while curving the shape of the trim along the curved shape of the window frame.

At this time, the trim according to Japanese Unexamined Patent Publication No. 2014-196051 is a highly rigid member made from a hard resin as a whole and including the bottom wall, the side wall closer to the glass run, and the side wall closer to the body that are integral with each other. It is thus difficult to curve the trim being attached to the window frame, which may lead to poor attachment workability.

To address the problem, the trim may be configured as follows to be easily curved when being attached to the window frame. The trim may include a core embedded therein. The part of the trim other than the core may be made from a material with a low flexural modulus.

However, the present inventors have found that the following problem might occur in view of the attachment of the band-like decorative member as in Japanese Unexamined Patent Publication No. 2014-196051. Specifically, the trim has the structure including the core embedded therein, the portion of the trim outside the passenger compartment is made from a material with a much lower rigidity than the material of the core. The decorative member is attached to this portion with the lower rigidity. As a result, the material with the lower rigidity is located on the back surface of the decorative member. If an object, for example, hits the decorative member, the trim fails to reduce deformation of the decorative member and rather increases the amount of the deformation of the decorative member. The mark of the deformation (hereinafter referred to as a "dent") may tend to remain on the decorative member. The decorative member is a vehicle exterior member and is thus highly visible. The remaining dent tends to lead to appearance defects.

The present disclosure was made in view of the problems. It is an objective of the present disclosure to attach a decorative member to a side of a glass run outside a passenger compartment without degrading the workability in attaching the glass run to a window frame, while reducing possible dents of the decorative member.

In order to achieve the objective, a trim according to the present disclosure includes, at its portion outside a passenger compartment, a base member with a high flexural modulus, and a decorative member fixed to this base member.

A first aspect of the present disclosure is directed to a glass run, for an automotive door, attached to a glass run mount plate from an outside of a passenger compartment to seal a gap between a window frame and a window glass, the window frame extending to define a window opening of the automotive door, the glass run mount plate extending along an upper edge of the window frame toward the outside of the passenger compartment. The glass run includes: a trim made from an elastomer, and including an upper wall extending along an upper surface of the glass run mount plate, a lower wall extending along a lower surface of the glass run mount plate, and an exterior wall, outside the passenger compartment, extending downward from a side of the upper wall outside the passenger compartment and continuous with a side of the lower wall outside the passenger compartment; a core embedded in the trim; a base member located at a side of the exterior wall outside the passenger compartment, and made from a material with a higher flexural modulus than the elastomer of the trim; and a decorative member fixed to a side of the base member outside the passenger compartment.

In this configuration, the trim is made from an elastomer and includes the core embedded therein. This configuration allows the flexural rigidity of the entire trim not to increase too much and to be kept properly. Accordingly, when attached to the upper edge of the wind frame, the glass run is easily curved along the shape of the window frame, which reduces degradation in the attachment workability.

In addition, the decorative member is fixed to the base member made from the material with the high flexural modulus. This fixation allows the base member on the back of the decorative member to be less deformed when an object, for example, hits the decorative member. Thus, possible deformation of the decorative member is reduced. Accordingly, the decorative member is deformed at a smaller amount and less subject to dents.

In a second aspect of the present disclosure, the material of the base member has a flexural modulus of 850 MPa or more.

Specifically, the base member made from a material with a flexural modulus less than 850 MPa tends to cause dents at the time of treatment of the glass run before being attached to the window frame or in general use of the glass run after being attached to the window frame. A flexural modulus of 850 MPa or more hardly causes dents in the situations described above except for intentional acts. Even if there is a dent, the dent is significantly small and hardly visible.

In view of reducing possible dents, the base member is made from a material with a flexural modulus of preferably 900 MPa or more, and more preferably 950 MPa or more. The base member is made from a material with a flexural modulus of 4500 MPa or less in one preferred embodiment. This is because the base member made from a material with a flexural modulus over 4500 MPa makes it difficult to curve the trim when the trim is attached to the window frame.

In a third aspect of the present disclosure, the base member is continuous in a longitudinal direction of a vehicle and continues from an upper end to a lower end of the exterior wall.

With this configuration, the base member covers the most part of the exterior wall. If the decorative member extends from the front end to the rear end of the exterior wall, possible dents can be reduced over the wide area.

In a fourth aspect of the present disclosure, the base member has a thickness of 2 mm or less.

Specifically, the base member with a thickness over 2 mm increases the flexural rigidity of the trim too much. This too high flexural rigidity may cause difficulty in curving the trim along the shape of the upper edge of the window frame when attaching the trim to the upper frame. The base member with a thickness of 2 mm or less does not increase the flexural rigidity of the trim too much, which reduces the degradation of the workability in attaching the trim to the upper edge of the window frame.

In a fifth aspect of the present disclosure, the decorative member is continuously fixed to the base member from the lower end to the upper end of the base member.

Specifically, when the linear trim including the decorative member fixed thereto is curved along the shape of the window frame, the curve has a smaller length on the inner side than on the outer side. Accordingly, wrinkles may appear on the inner side of the curve of the decorative member. In the configuration, however, the decorative member is continuously fixed to the base member from the upper end to the lower end of the base member with a high flexural rigidity. This fixation allows fewer wrinkles appear on the decorative member.

In a sixth aspect of the present disclosure, the upper end and the lower end of the base member are bent toward an inside of the passenger compartment.

With this configuration, being embedded in the exterior wall of the trim, the upper and lower ends of the decorative member fixed to the base member are less peeled.

In the first aspect, the core is embedded in the trim made from the elastomer; the trim has, on its exterior wall, the base member with the high flexural modulus; and the decorative member is fixed to the base member. This configuration reduces possible dents without degrading the workability in attaching the trim to the window frame.

According to the second aspect, the base member made from a material with a flexural modulus of 8501 MPa or more reduces possible dents in general use.

According to the third aspect, the base member is continuous longitudinally and from the upper end to the lower end of the exterior wall and thus reduces possible dents throughout the wide area of the decorative member.

According to the fourth aspect, the base member with a thickness of 2 mm or less reduces an excessive increase in the flexural rigidity of the trim, while reducing possible dents on the decorative member. As a result, the workability improves in attaching the trim to the upper edge of the window frame.

According to the fifth aspect, the decorative member is continuously fixed to the base member from the upper end to the lower end of the base member. Even when the linear trim including the decorative member fixed thereto is curved along the shape of the window frame, fewer wrinkles may appear on the decorative member, which improve the appearance of the vehicle.

In the sixth aspect, the upper and lower ends of the base member are bent toward the inside of the passenger compartment. This configuration allows the decorative member to be less peeled.

DETAILED DESCRIPTION

An embodiment of the present disclosure will be described in detail with reference to the drawings. Note that the following description of the preferred embodiment is merely illustrative in nature and is not intended to limit applications or uses of the present disclosure.

Configuration of Door

Figure 1:
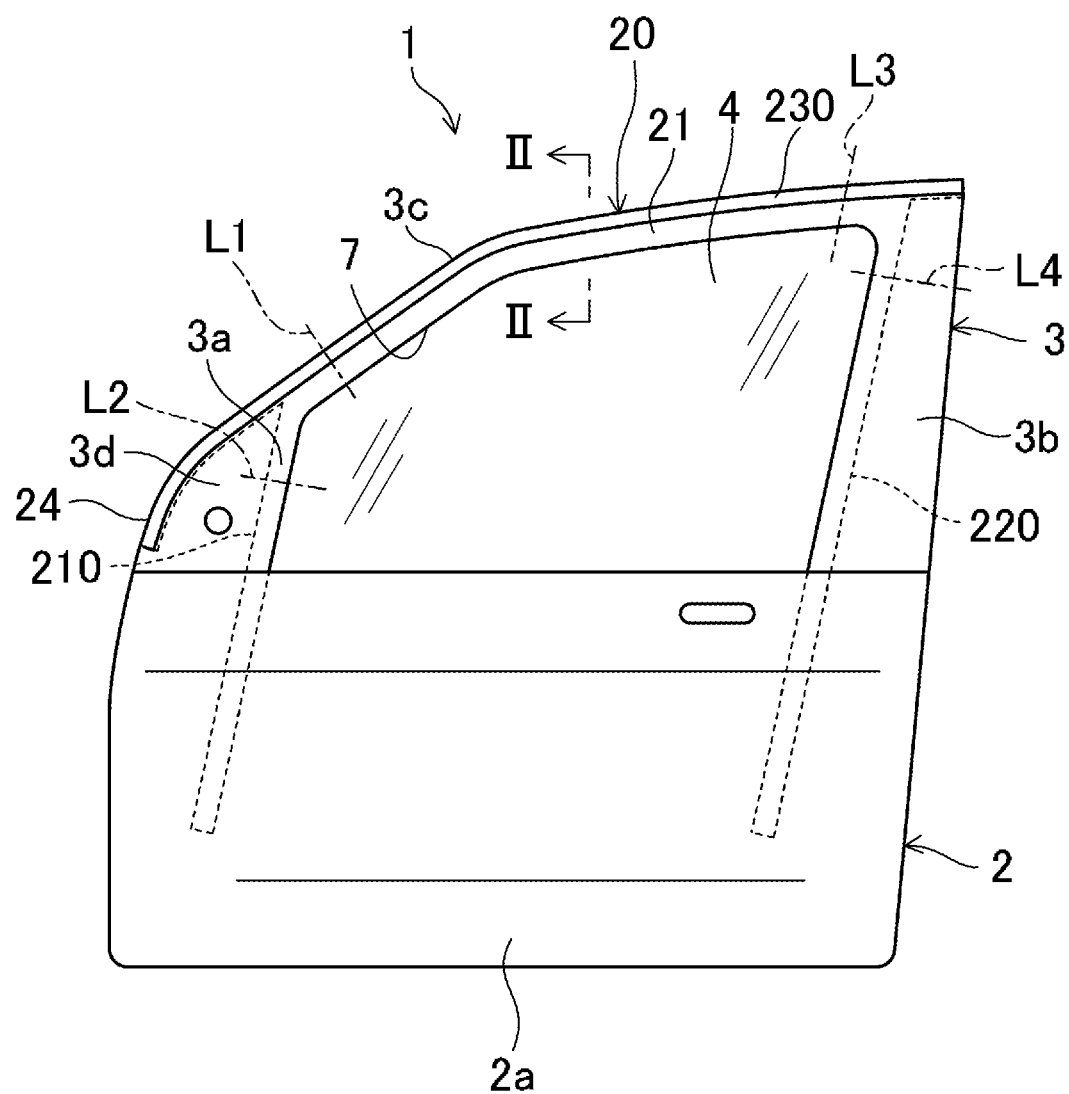
FIG. 1 illustrates an automotive door including a glass run for an automotive door according to an embodiment, as viewed from the outside of a passenger compartment.

FIG. 1 is a side view of an automotive door 1 equipped with an automotive door glass run 20 according to an embodiment of the present disclosure as seen from the outside of a passenger compartment. This automotive door 1 is a front door to be provided at the front on each side of a motor vehicle (not shown) and uncovers or covers an opening (not shown) at the front on the side of the vehicle. Although not shown, if a rear door is provided on each side of the vehicle, the present disclosure is also applicable to a glass run attached to the rear door.

Note that in the description of this embodiment, a vehicle front side is simply referred to as "front," and a vehicle rear side is simply referred to as "rear."

The automotive door 1 includes a door body 2 constituting substantially the lower half of the automotive door 1, and a window frame 3 constituting substantially the upper half. Although not shown, the front end of the door body 2 is attached to a pillar of the vehicle body via a hinge including a rotary shaft extending vertically. The door body 2 includes an inner panel (not shown) and an outer panel 2a that are steel plates, for example. The door body may house a window glass 4 that is lifted or lowered, and a window regulator (not shown) for lifting or lowering the window glass 4, for example.

Figure 2:
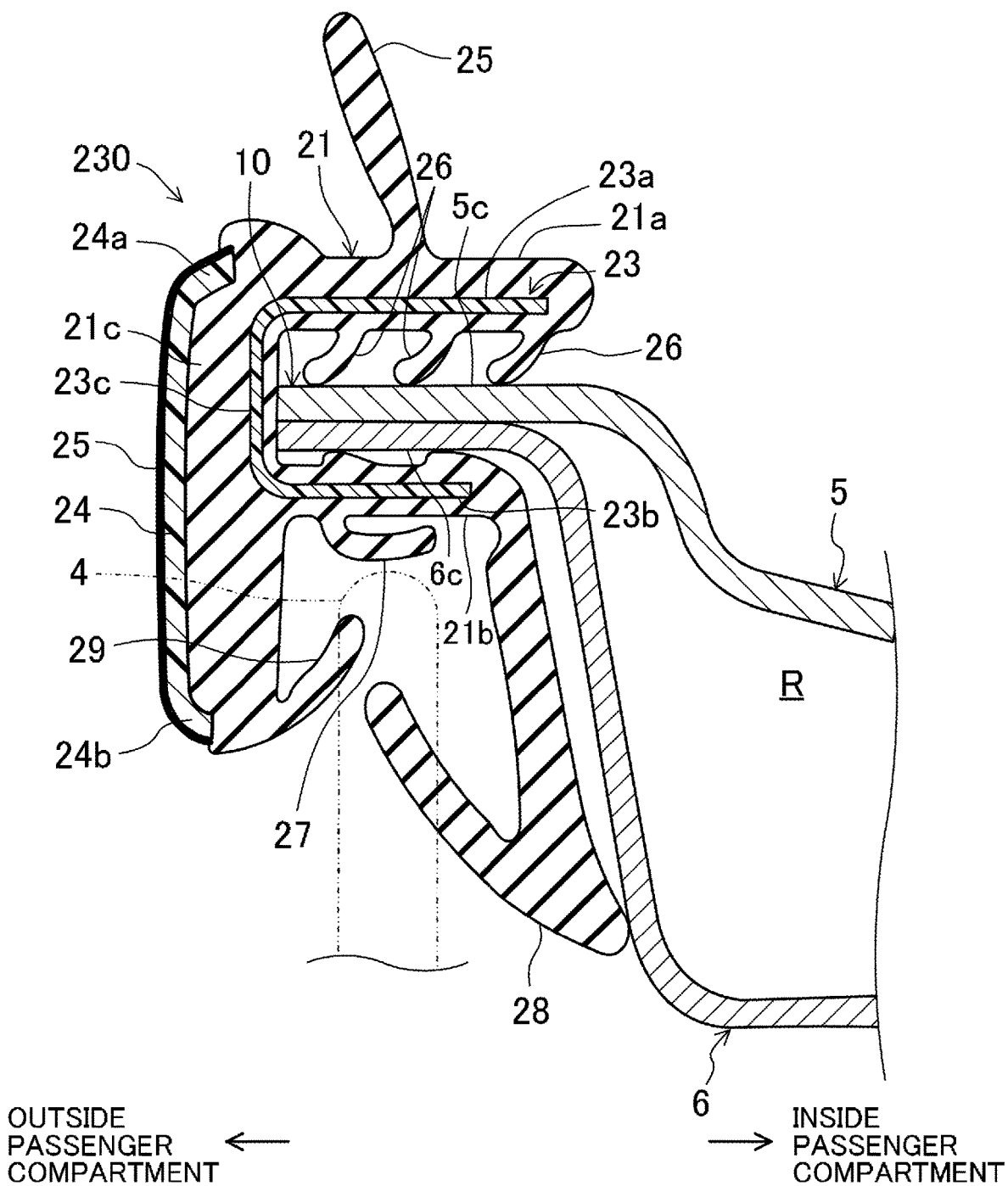
FIG. 2 is a cross-sectional view taken along line II-II in FIG. 1.
Figure 3:
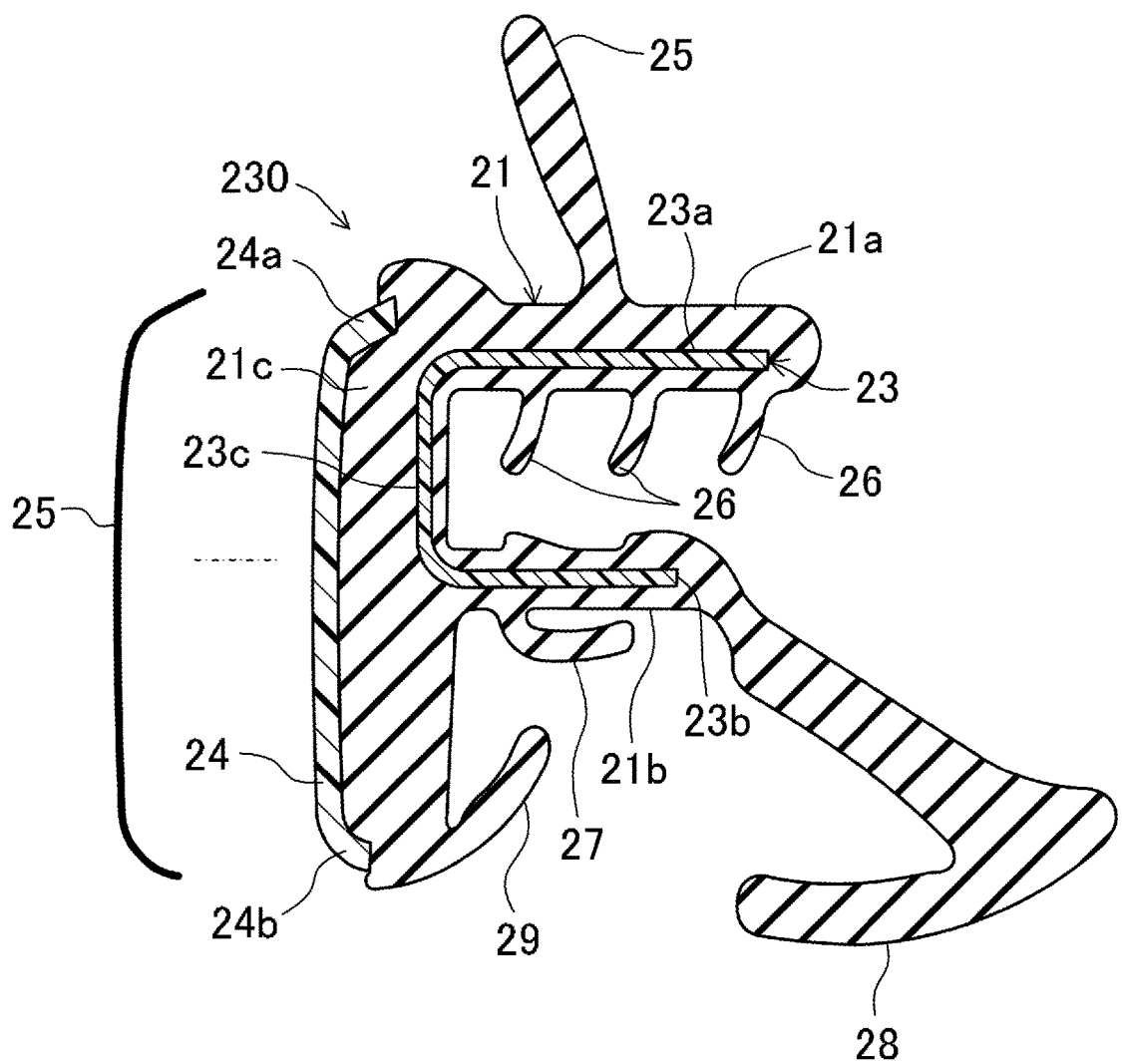
FIG. 3 is a cross-sectional view of the glass run for an automotive door before being attached to a window frame.

The window frame 3 functions as a sash for holding the peripheral edge of the window glass 4 and extends to define a window opening 7. The window opening 7 defined by the window frame 3 is covered or uncovered by the window glass 4. As shown in FIG. 2, the window frame 3 according to this embodiment includes a first panel member 5 and a second panel member 6 in combination that are obtained by press molding of a steel plate, for example.

As shown in FIG. 1, the window frame 3 includes a front frame 3a, a rear frame 3b, and an upper frame 3c. The front frame 3a protrudes upward from the front of the upper edge of the door body 2. The rear frame 3b extends upward from the rear of the upper edge of the door body 2. The rear frame 3b extends to be taller than the front frame 3a. The upper frame 3c extends longitudinally from the upper end of the front frame 3a to the upper end of the rear frame 3b along a side edge of a roof (not shown) of the vehicle body. While the upper frame 3c is generally curved, the shape is not limited to the shown one and may be curved upward as a whole. The position of the curve and the inclination angle of the upper frame 3c may be freely determined in accordance with the shape of the roof of the vehicle body.

The window frame 3 includes, in front of the front frame 3a, a door mirror mount 3d to which a door mirror (not shown) is attached. The upper edge of the door mirror mount 3d is continuous with the front end of the upper frame 3c of the window frame 3. The door mirror mount 3d is not essential.

As shown in FIG. 2, the window frame 3 includes a glass run mount plate 10 extending toward the outside of the passenger compartment. The first and second panel members 5 and 6 constituting the window frame 3 may be referred to as inner and outer panels, respectively, and define a hollow R inside the window frame 3. The first panel member 5 includes, at a portion outside the window opening 7, an outer plate 5c extending toward the outside of the passenger compartment. The second panel member 6 includes, at a portion outside the window opening 7, an outer plate 6c extending toward the outside of the passenger compartment. Then, the outer plate 5c of the first panel member 5 and the outer plate 6c of the second panel member 6 are stacked vertically and joined together to form the glass run mount plate 10 that is continuous in the longitudinal direction.

Configuration of Glass Run

The glass run 20 is assembled to the window frame 3 from the outside of the passenger compartment and functions as a sealing member for sealing the gap between the window frame 3 and the window glass 4.

The glass run 20 includes extruded parts obtained by extrusion and molded parts obtained by molding in combination. As shown in FIG. 1, one of the molded parts extends, at the boundary between the upper glass run 230 and the front vertical glass run 210 of the glass run 20, between boundary lines (i.e., one-dot chain lines) L1 and L2. The other molded part extends, at the boundary between the upper glass run 230 and the rear vertical glass run 220 of the glass run 20, between boundary lines (i.e., one-dot chain lines) L3 and L4. The other parts of the glass run are the extruded parts.

The upper glass run 230 includes a glass run body (or a trim) 21 assembled to the glass run mount plate 10 of the window frame 3, a core 23, a base member 24, and a decorative member 25. The glass run body 21 includes an upper wall 21a, a lower wall 21b, and an exterior wall 21c outside the passenger compartment. The upper wall 21a extends along the upper surface of the glass run mount plate 10. The lower wall 21b extends along the lower surface of the glass run mount plate 10. The exterior wall 21c extends downward from the side of the upper wall 21a outside the passenger compartment and continuous with the side of the lower wall 21b outside the passenger compartment. The exterior wall 21c protrudes downward from the lower wall 21b. The lower end of the exterior wall 21c faces the surface of the window glass 4 outside the passenger compartment.

The glass run body 21 is made from a rubber-like elastic material such as an elastomer and is thus easily elastically deformed. The glass run body 21 includes no core 23, which will be described later. The glass run body 21 may be made from a rubber such as an ethylene-propylene-diene-rubber (EPDM) or a thermoplastic elastomer (TPE) such as a thermoplastic olefin (TPO) and a thermoplastic styrene (TPS). The rubber and TPE may be a sponge material or a solid material.

The upper wall 21a is integral with an upper seal lip 25 on its upper surface. The upper seal lip 25 protrudes upward from the upper surface of the upper wall 21a. When the automotive door 1 is closed, the upper seal lip 25 comes into contact with the panel (not shown) of the vehicle body and deformed to seal the gap between the automotive door 1 and the vehicle body panel. The upper wall 21a has, on its lower surface, a plurality of protrusions 26 protruding downward. Coming into contact with the upper surface of the glass run mount plate 10, the protrusions 26 are elastically deformed.

The lower wall 21b is integral with a lower seal lip 27 on its lower surface. The upper end of the closed window glass 4 is in contact with the lower seal lip 27. The lower wall 21b is integral with an interior seal lip 28, inside the passenger compartment, at its end inside the passenger compartment. Coming into contact with the interior surface of the closed window glass 4, the interior seal lip 28 is elastically deformed.

The exterior wall 21c is integral with an exterior seal lip 29, outside the passenger compartment, at its lower end. Coming into contact with the exterior surface of the closed window glass 4, the exterior seal lip 29 is elastically deformed.

Configuration of Core 23

The core 23 is embedded in the glass run body 21. The core 23 may be made from, for example, a hard resin (e.g., a resin containing talc or glass fibers), an aluminum alloy, a steel material, or stainless steel. The material is harder and has a higher rigidity than that of the glass run body 21. The core 23 has an upper plate 23a embedded in the upper wall 21a of the glass run body 21, a lower plate 23b embedded in the lower wall 21b, and a side plate 23c embedded in the exterior wall 21c. The upper, lower, and side plates 23a, 23b, and 23c are integral with each other.

Being an extruded part, the upper glass run 230 of the glass run 20 has a linear shape after molding. On the other hand, the upper frame 3c of the window frame 3 curves as described above. When attaching the upper glass run 230 to the upper frame 3c of the window frame 3, the upper glass run 230 needs to be curved into a shape according to the upper frame 3c. At this time, since not the entire glass run body 21 but only the core 23 is a rigid member, the upper glass run 230 has a rigidity that does not increase more than necessary, that is, a proper rigidity. With this proper rigidity, a force required to curve the upper glass run 230 is small.

Configuration of Base Member 24

The base member 24 is located at the side of the exterior wall 21c of the glass run body 21 outside the passenger compartment. The base member 24 is continuous in the longitudinal direction from the front end to the rear end of the exterior wall 21c, and is continuous from the upper end to the lower end of the exterior wall 21c.

The base member 24 is made from a material with a flexural modulus higher than that of the glass run body 21. Specifically, the base member 24 is made from a material with a flexural modulus of 850 MPa or more. Note that the flexural modulus described herein is obtained in accordance with ISO 178. Examples of the material capable of obtaining such a flexural modulus include a material obtained by mixing talc or glass fibers into polypropylene. A desired flexural modulus may be obtained by changing the amount of the talc or glass fiber to be mixed. The material of the base member 24 is not limited to those described above and may be another material as long as having a desired flexural modulus. The base member 24 made from a material with a flexural modulus of 850 MPa or more causes fewer dents on the decorative member 25, as will be described later.

The base member 24 may be made from a material with a flexural modulus of preferably 900 MPa or more, more preferably 950 MPa or more. With an increase in the flexural modulus of the material of the base member 24, the decorative member 25 is further less subject to dents.

The base member 24 is made from a material with a flexural modulus of 4500 MPa or less in one preferred embodiment. Specifically, the base member 24 made from a material with a flexural modulus over 4500 MPa increases the flexural rigidity of the glass run body 21 too much. The too high flexural rigidity may cause difficulty in curving the upper glass run 230 along the shape of the upper frame 3c of the window frame 3 when attaching the upper glass run 230 to the upper frame 3c. The base member 24 made from a material with a flexural modulus of 4500 MPa or less does not increase the flexural rigidity of the glass run body 21 too much, which reduces the degradation of the workability in attaching the upper glass run 230 to the upper frame 3c. The base member 24 may be made from a material with a flexural modulus of preferably 3500 MPa or less, and more preferably 3000 MPa or less. This flexural modulus further improves the workability in attaching the upper glass run 230 to the upper frame 3c.

The base member 24 has a thickness of 2 mm or less. Specifically, the base member 24 with a thickness over 2 mm increases the flexural rigidity of the glass run body 21 too much. This too high flexural rigidity may cause difficulty in curving the glass run body 21 along the shape of the upper frame 3c of the window frame 3 when attaching the glass run body 21 to the upper frame 3c. The base member 24 with a thickness of 2 mm or less does not increase the flexural rigidity of the glass run body 21 too much, which reduces the degradation of the workability in attaching the glass run body 21 to the upper frame 3c.

More preferably, the base member 24 has a thickness of 1.5 mm or less. The base member 24 with a thickness of 1.5 mm or less allows the glass run body 21 to have a proper flexural rigidity and improves the workability in attaching the glass run body 21 to the upper frame 3c. Most preferably, the base member 24 has a thickness of 1.0 mm or less. This thickness further improves the workability in attaching the glass run body 21 to the upper frame 3c.

The base member 24 has an upper end serving as an upper bend 24a bent toward the inside of the passenger compartment. On the other hand, the base member 24 has a lower end serving as a lower bend 24b bent toward the inside of the passenger compartment. Being bent toward the inside of the passenger compartment, the upper and lower ends of the base member 24 are embedded in the exterior wall 21c.

The base member 24 is formed by co-extrusion with the glass run body 21 so as to be integral with the glass run body 21. Note that the base member 24 may not be formed by the co-extrusion with the glass run body 21. The base member 24 may be fixed to the exterior surface of the exterior wall 21c after extruding the glass run body 21.

Configuration of Decorative Member 25

The decorative member 25 is fixed to a side of the base member 24 outside the passenger compartment and constitutes a design portion of the vehicle. The decorative member 25 may be made from a sheet material or a film material with a multilayer structure including a sticky layer or an adhesive layer on the back of a design layer, for example. The design layer is made from a synthetic resin laminated film, a thin stainless steel film, a metal vapor deposited film, or a film with a decorative pattern on its surface, for example. Further, the design layer may be made from a film in a desired color. The sticky layer or the adhesive layer only needs to be sticky or adhesive to the base member 24 and may include a primer layer interposed between the sticky layer or the adhesive layer and the base member 24. Note that the sticky layer or the adhesive layer and the primer layer may be provided for the base member 24.

In this embodiment, the decorative member 25 is continuously fixed to the base member 24 from the upper end to the lower end of the base member 24. In addition, the decorative member 25 is fixed to the base member 24 continuously from the front end to the rear end of the base member 24. When the base member 24 is co-extruded with the glass run body 21, the decorative member 25 may be continuously supplied to and bonded to the exterior surface of the base member 24. Note that, after the base member 24 is integrated with the glass run body 21, the decorative member 25 may be bonded to the surface of the base member 24 outside the passenger compartment.

How to Attach Glass Run

In order to attach the upper glass run 230 of the glass run 20 to the upper frame 3c of the window frame 3, the glass run mount plate 10 is inserted into the gap between the upper wall 21a and the lower wall 21b of the upper glass run 230. At this time, curving of the upper glass run 230 in a shape according to the upper frame 3c allows the glass run mount plate 10 to be inserted from the front end to the rear end of the upper glass run 230. This insertion allows the upper glass run 230 to be attached to the upper frame 3c.

As described above, the core 23 and the base member 24 have proper rigidities. With the proper rigidities, a force required to curve the upper glass run 230 is small, which provides excellent attachment workability.

At the time of attachment, the linear upper glass run 230 including the decorative member 25 fixed thereto is curved along the shape of the upper frame 3c. The curve has a smaller length on the inner (i.e., lower) side than on the outer (i.e., upper) side. This length difference may cause wrinkles on the inner (i.e., lower) side of the decorative member 25. In this embodiment, however, the decorative member 25 is fixed to the base member 24 with a high flexural rigidity continuously from the upper end to the lower end of the base member 24. This fixation allows fewer wrinkles appear on the decorative member 25.

Advantage of Reducing Possible Dents

After having been attached to the window frame 3, the decorative member 25 faces the outside of the passenger compartment and may thus be hit by an object, for example. Before being attached to the window frame 3 as well, the decorative member 25 is located on the surface of the passenger compartment and may thus be hit by an object, for example. The decorative member 25 is fixed to the base member 24 made from a material with a high flexural modulus. This fixation allows the base member 24 on the back of the decorative member 25 to be less deformed when an object, for example, hits the decorative member 25. Thus, possible deformation of the decorative member 25 is reduced. Accordingly, the decorative member 25 is deformed at a smaller amount and less subject to dents.

The base member 24 made from a material with a flexural modulus of 850 MPa or more is significantly advantageous in reducing possible dents, while dents tend to remain with a flexural modulus less than 850 MPa. This fact is based on a result of a test assuming general use. The test method may be, for example, as follows. After a hard test body has hit the decorative member 25 at a predetermined speed, the relationship between the size and depth of the dent that remains on the decorative member 25 and the flexural modulus of the base member 24 is obtained. The base member 24 made from a material with a flexural modulus of 900 MPa or more causes a further smaller dent. The base member 24 made from a material with a flexural modulus of 950 MPa or more causes a significantly smaller dent.

Advantages of Embodiment

As described above, in this embodiment, the core 23 is embedded in the glass run body 21 made from an elastic material such as an elastomer, the glass run body 21 has, on its exterior wall 21c, the base member 24 with a high flexural modulus, and the decorative member 25 is fixed to the base member 24. This configuration reduces possible dents without degrading the workability in attaching the glass run body 21 to the window frame 3.

The base member 24 made from a material with a flexural modulus of 850 MPa or more reduces possible dents in general use. In addition, the base member 24 that is continuous longitudinally and from the upper end to the lower end of the exterior wall 21c reduces possible dents throughout the wide area of the decorative member 25.

In addition, the upper and lower ends of the base member 24 are bent toward the inside of the passenger compartment. This configuration allows an object to hardly hit the upper or lower end of the decorative member 25, which reduces the peeling of the decorative member 25.

The embodiment described above is a merely example in every respect, and shall not be interpreted in a limited manner. Furthermore, any variations or modifications falling within the range of equivalents to the claims are all encompassed within the scope of the present disclosure.

As described above, the glass run for an automotive door according to the present disclosure is, for use, attached to a door in a motor vehicle.

What is claimed is:

1. A glass run, for an automotive door, attached to a glass run mount plate from an outside of a passenger compartment to seal a gap between a window frame and a window glass, the window frame extending to define a window opening of the automotive door, the glass run mount plate extending along an upper edge of the window frame toward the outside of the passenger compartment, the glass run comprising:
a trim made from an elastomer, and including an upper wall extending along an upper surface of the glass run mount plate, a lower wall extending along a lower surface of the glass run mount plate, and an exterior wall, outside the passenger compartment, extending downward from a side of the upper wall outside the passenger compartment and continuous with a side of the lower wall outside the passenger compartment;
a core embedded in the trim;
a base member located at a side of the exterior wall outside the passenger compartment, and made from a material with a higher flexural modulus than the elastomer of the trim, wherein the elastomer includes a thermoplastic material and a thickness of the base member is thinner than a thickness of the exterior wall when viewed in a direction from inside to outside of the passenger compartment; and
a decorative member fixed to a side of the base member outside the passenger compartment.

2. The glass run of claim 1, wherein
the material of the base member has a flexural modulus of between 850 MPa and 4500 MPa.

3. The glass run of claim 1, wherein
the base member is continuous in a longitudinal direction of a vehicle and continues from an upper end to a lower end of the exterior wall.

4. The glass run of claim 1, wherein
the base member has a thickness of between 1 mm and 2 mm.

5. The glass run of claim 1, wherein
the decorative member is continuously fixed to the base member from a lower end to an upper end of the base member.

6. The glass run of claim 1, wherein
an upper end and a lower end of the base member are bent toward an inside of the passenger compartment.

* * * * *